E. H. BARKER
April 19, 1932. DISPENSING TUBE Re. 18,433
Original Filed Feb. 9, 1928
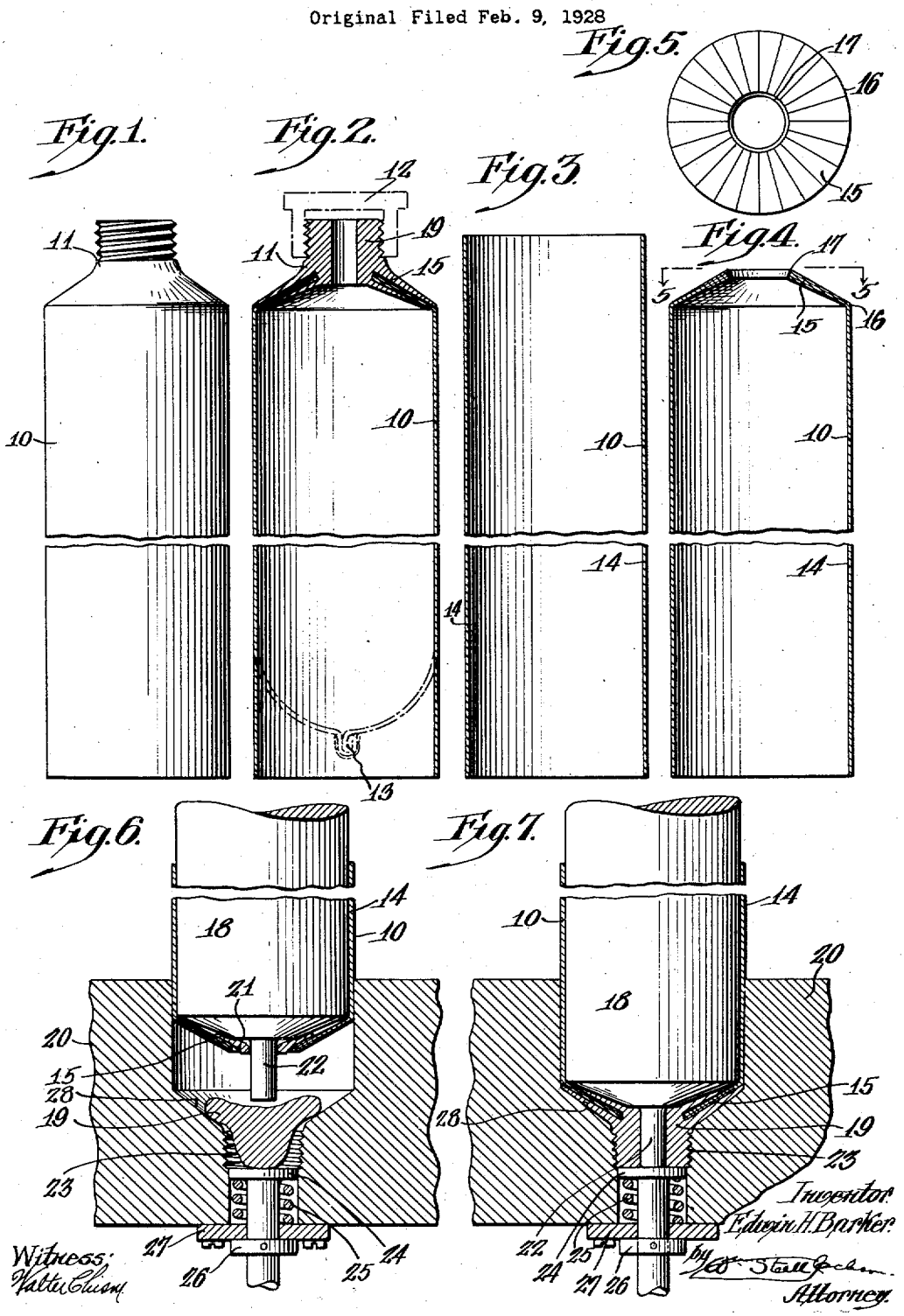

Reissued Apr. 19, 1932 Re. 18,433

UNITED STATES PATENT OFFICE

EDWIN H. BARKER, OF MOYLAN, PENNSYLVANIA, ASSIGNOR TO A. H. WIRZ, INC., OF CHESTER, PENNSYLVANIA, A CORPORATION OF PENNSYLVANIA

DISPENSING TUBE

Original No. 1,754,496, dated April 15, 1930, Serial No. 252,998, filed February 9, 1928. Application for reissue filed March 8, 1932. Serial No. 597,604.

My invention relates to dispensing tubes for use in dispensing shaving cream, tooth paste, cosmetics and the like.

A purpose of my invention is to use paper impregnated with a suitable waterproofing filler such as bakelite lacquer, rubber, paraffin or oil for the body portion of a dispensing tube. Optionally I may use any other suitable fibrous or other non-metallic flexible material than paper, for example fabric.

A further purpose is to mold a dispensing terminal of bakelite or optionally of other suitable molding material around both the inside and the outside of the inwardly crimped end of a dispensing tube of paper or other suitable non-metallic flexible material and to use the progressively greater thickness of the paper toward the end of the paper due to crimping it inwardly to progressively smaller diameter for making an interlocking bond between the crimped end of the paper and the enfolding molding material.

Further purposes will appear in the specification and in the claims.

I have elected to show one only of the different forms of my invention, selecting a form that is practical and efficient in operation and which well illustrates the principles involved.

Figure 1 is a longitudinal elevation of a finished dispensing tube embodying my invention.

Figure 2 is a longitudinal section of Figure 1 taken in the plane of the drawings and showing in dot-and-dash the tube of Figure 1 supplied with a usual cap and a usual folded closure at the filling end.

Figure 3 is a longitudinal section of a tube of paper or other suitable non-metallic flexible material, for use in manufacturing the body portion of my dispensing tube.

Figure 4 is a longitudinal section generally similar to Figure 3 but showing the dispensing end of the tube crimped inwardly preparatory to molding.

Figure 5 is a top plan of Figure 4.

Figures 6 and 7 are sectional elevations through a conventional molding machine and illustrate different steps of the molding of a dispensing terminal on to the crimped end of the tube shown in Figure 4.

Like numerals refer to like parts in all figures.

Describing in illustration and not in limitation and referring to the drawings:

In the past it has been customary to manufacture dispensing tubes by extrusion molding, the body portion of the tube and its dispensing terminal being a single integral member molded under great pressure, during which the metal forming the body portion of the dispensing tube and usually tin, flows up around a moving die or mandrel that is forcing its way into the tin or other metal molding material within a stationary portion of the mold.

One of the purposes of my invention is to use a less costly material for the manufacture of dispensing tubes that will be equally well adapted to meet the needs of service.

I have discovered that a body portion of paper or other suitable non-metallic flexible material impregnated with a waterproofing filler such as oil, bakelite lacquer, paraffin or rubber meets well the conditions of service and that the end terminal of the dispensing tube may be molded upon the inwardly bent end of a tubular body of paper or other suitable non-metallic flexible material so as to give a dispensing tube that is at once very satisfactory in use and inexpensive to manufacture.

The finished dispensing tube proper comprises a tubular body 10 and a terminal 11 that has hitherto usually been made integral with the body.

A cap 12, of any desired and suitable type, is shown in dot-and-dash Figure 2, and will usually be supplied with the dispensing tube but does not have direct relevance to the present invention.

A closure 13, also shown dot-and-dash in Figure 2, is made by the customer after the tube has been filled and also has no direct relevance to the present invention.

I show in Figure 3 an ordinary tube 14, preferably of paper but permissibly of another suitable non-metallic flexible material. The tube 14 has been suitably impregnated with waterproofing material as already described.

The first step in manufacturing my new tube is to inwardly crimp the dispensing end of the tube shown in Figure 3. This crimping may be effected in any suitable way and gives an end portion 15 that converges inwardly toward the tube axis as illustrated in Figure 4.

It will be evident that the inward crimping of the tube causes a progressive bunching of the material in the tube portions progressively nearer the tube axis so that the effective thickness of the material in the crimped portion progressively increases from the beginning of the crimped end at 16 to its innermost edge at 17, the quantity of material around the small inner circle (Figure 5) at 17 being exactly the same as that around the outside portion of the tube at 16.

I mount the tube 14 on a metal die member 18, Figure 6, and place a suitable quantity of molding material 19 in a stationary mold 20 below and properly alined with the movable die member.

The movable member is forced down under high pressure into the molding material at a temperature appropriate to the material used. I thus cause the molding material to enfold the crimped end of the tube of paper or other suitable non-metallic flexible material. The molding material and the crimped end portion of the tube fill all of the space between the mating members of the mold when the movable member has been forced down into its lower-most position. In normal operation, using a lump of molding material in the bottom of the fixed die, the material will flow about and thoroughly "face" or cover both sides of the crimped end. Bakelite is a very excellent plastic-molding material for my purpose but any other suitable material may be used.

To avoid any marked tendency for the extrusion molding to force the end portion of the tube outwardly ahead of the flowing molding material, I may mount a portion of the molding material in the form of an annulus 21 placed inside the crimped end of the tube and about post 22, the remainder lying between the crimped end and the stationary mold. I prefer to crimp the dispensing end of the tube at 15 before placing it on the movable die but optionally may crimp and mold with the same stroke of the die.

The illustration of the molding members is intended to be a conventional one for any suitable molding mechanism. As illustrated, the stationary member 20 is provided with a threaded portion at 23 to form the threaded end of the terminal. A base member 24 is spring-pressed at 25 into position to receive the end of the downwardly moving central post 22 of the die member. This supporting member is kept from moving upwardly by a suitable collar 26 and is slidably mounted in a plate 27 fastened rigidly to the bottom of the stationary mold.

When the lower end 22 of the movable member engages the upwardly pressing member 24, the latter member yields downwardly sufficiently to permit the full down stroke of the moving die member. This yielding prevents the pressure against the lower end of the moving member from becoming unduly high.

The die member on its up stroke moves out of the tube 14 which is left firmly imbedded in the molded terminal.

The lower and stationary molding member may or may not be divided for more easy removal of the threaded terminal from its molded seat. Usually this member will be made in one piece in which event the tube will be spun out of the thread at 23.

The upwardly directed and outwardly flaring portion 28 of the lower mold member will frequently be given a suitable lettering or other marking in accord with the desires of the customer. In this event the lower mold member will be divided.

The dispensing tubes are provided with suitable caps 12 of Figure 2 and sold with the charging end 13 open.

The customer fills the tube at the open end and subsequently folds the open end together as illustrated in dot-and-dash in Figure 2, in the usual way. This however, forms no part of the present invention which is directed at a two-part dispensing tube having a body portion made up of paper or other suitable fibrous or other non-metallic flexible material impregnated with suitable waterproofing material and a molded dispensing terminal enfolding the inwardly crimped end of the tubular body portion.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention, what I claim as new and desire to secure by Letters Patent is:

1. A two-part collapsible dispensing tube comprising a fibrous body portion and a dispensing terminal molded to one end thereof.

2. A two-part collapsible dispensing tube comprising a fibrous body portion, an impregnating filler within the interstices of the material of the body portion to make said portion impervious to the tube contents, and a dispensing terminal molded to one end of the body portion.

3. A two-part collapsible dispensing tube comprising a paper body portion and a dispensing terminal molded to one end thereof.

4. A two-part collapsible dispensing tube comprising a paper body portion, an impregnating filler within the interstices of the material of the body portion to make said portion impervious to the tube contents, and a dispensing terminal molded to one end of the body portion.

5. A collapsible dispensing tube comprising a body portion of fibrous material crimped inwardly at one end, and a molded dispensing terminal having a molded interlocking bond with the inside and outside surfaces of the end.

6. A collapsible dispensing tube comprising a tubular body having a conically inwardly extending section at one end that progressively increases in thickness of material inwardly from the outer portion of the conical section and a molded dispensing terminal engaging the inside and outside surfaces of the conical section and receiving an interlocking bond therewith by reason of the inward progressive increase in thickness.

7. A collapsible dispensing tube having the body and terminal separate, the body portion inwardly crimped and thereby wedged with the base of the wedge at the portion of smaller diameter and a terminal integral and tightly engaging both inside and outside of the wedge portion of the body.

8. A collapsible dispensing tube comprising a collapsible body portion ending in an inwardly directed apertured wedge shoulder having the thicker end of the wedge adjacent to the center and an externally threaded apertured integral dispensing terminal therefor, tightly engaging the inside and outside of the wedge shaped end shoulder and permanently attached to it.

9. A collapsible dispensing tube having a body portion of fibrous material, a dispensing terminal of bakelite molded to the body portion and a cap for the terminal.

10. A collapsible tube comprising a tubular body of non-metallic flexible material and a non-metallic terminal molded to the body annularly around the end of the body, having a discharge opening for the tube and adapted to receive a closure for the discharge opening.

11. A collapsible tube comprising a tubular body of non-metallic flexible material, a waterproof coating on the body and a non-metallic terminal molded to the body annularly around the end of the body, having a discharge opening for the tube and adapted to receive a closure for the discharge opening.

12. A collapsible tube comprising a tubular body of non-metallic flexible material having an end portion which approaches the tube axis and a one-piece terminal which minutely follows the contour of the end portion of the body both inside and outside the body and which has a discharge opening and means for attaching a closure for the discharge opening.

13. A collapsible tube comprising a tubular body of non-metallic flexible material having an end portion which approaches the tube axis, a waterproof coating on the body and a one-piece non-metallic molded terminal which minutely follows the contour of the end portion of the body both inside and outside the body and which has a discharge opening and means for attaching a closure for the discharge opening.

14. A collapsible tube comprising a tubular body of non-metallic flexible material having an end portion inwardly bent and crimped and a one-piece terminal of plastic-molding material having parts minutely following the contour of the inside and outside of the crimped end, holding the crimped end between the parts, having a discharge opening for the tube and adapted to receive a closure for the discharge opening.

15. A collapsible tube consisting entirely of non-metallic material and comprising a flexible tubular body having an end portion sloping toward the tube axis and a terminal of plastic-molding material secured to the end portion, lying wholly within the external diameter of the tubular body and having a discharge opening for the tube.

EDWIN H. BARKER.